United States Patent [19]
Carrow

[11] 3,907,961
[45] Sept. 23, 1975

[54] FLEXIBLE CYLINDER FOR COOLING AN EXTRUDED PIPE

[75] Inventor: Guy E. Carrow, Bartlesville, Okla.

[73] Assignee: Phillips Petroleum Company, Bartlesville, Okla.

[22] Filed: Jan. 28, 1974

[21] Appl. No.: 436,977

[52] U.S. Cl. .................. 264/314; 264/90; 264/166; 264/209; 264/237; 264/348; 425/71; 425/380
[51] Int. Cl.² .... B29C 17/06; B29C 25/00; B29F 3/08; B29C 23/00
[58] Field of Search ......... 264/89, 90, 95, 209, 313, 264/210 R, 237, 314, 166; 425/380, 381, 326 R, 466, 71, 72; 249/178, 183

[56] References Cited
UNITED STATES PATENTS

| | | | |
|---|---|---|---|
| 2,317,687 | 4/1943 | Larchar | 264/209 |
| 3,299,192 | 1/1967 | Lux | 264/237 |
| 3,309,436 | 3/1967 | Larsen | 264/176 R |
| 3,320,637 | 5/1967 | Van Dijk | 264/209 |
| 3,522,337 | 7/1970 | Ball | 425/72 |
| 3,711,232 | 1/1973 | Van Zon | 425/326 R |
| 3,821,349 | 6/1974 | Mozer | 264/237 |

*Primary Examiner*—Jeffery R. Thurlow

[57] ABSTRACT

An extruded pipe is cooled by passing a cooling fluid through a chamber formed by the inner surface of the extruded pipe and the grooves in the outer surface of a grooved flexible cylinder.

12 Claims, 2 Drawing Figures

FLEXIBLE CYLINDER FOR COOLING AN EXTRUDED PIPE

BACKGROUND

The invention relates to a method and apparatus for cooling an extruded pipe.

Extrusion is a technique frequently used to produce pipe or tubing from thermoplastic materials. Examples of some thermoplastic materials suitable for use in extrusion processes are nylon, polyvinyl acetate, polyvinyl chloride, and polyolefins, such as polyethylene.

Extruded thermoplastic pipe or tubing is an important industrial product. It finds particular advantage when used in corrosive service and it is excellent sewer line material. Extruded thermoplastic pipe is produced in a wide variety of sizes. Internal diameters of over 60 inches and wall thicknesses of over 2 inches are possible.

Two types of extrusion most commonly used to produce thermoplastic pipe are screw extrusion and impact extrusion. Screw extrusion is a process in which a heated screw pump pumps molten thermoplastic material through an orifice or die which has a shape designed to produce the desired product. The thermoplastic material generally leaves the die in a molten state and must be handled carefully during the subsequent cooling to avoid deforming the product.

Impact extrusion is a process in which thermoplastic particles are compacted by a reciprocating piston type pump and transferred to a heating zone wherein the particles are melted into a mass. The mass is advanced to a mixing zone and then through a die in which a product of the desired shape is formed. Also the product is cooled in the die to a point whereby at least the surfaces of the product are solidified.

Generally one of the factors limiting production in either process is the rate at which the product can be cooled. It is necessary to solidify substantially the entire thickness of the pipe wall to prevent "breakthrough", that is, where the molten thermoplastic material in the interior or center portion of the pipe wall breaks through either or both surfaces of the pipe wall, forming a mass of thermoplastic material thereon and producing a flaw in the pipe. The outer surface of extruded pipe is usually cooled adequately by a water cascade or an immersion bath once the tubing has left the die; however, the inner surface is more difficult to cool. Extending the die or at least the mandrel to cool the inner surface adequately to prevent breakthrough is difficult because the mandrel is a cantilevered member and an increase in pressure at the secured portion of the mandrel due to the longer length required for cooling generally would be prohibitive. A number of other methods have been developed for cooling the inner surface of extruded thermoplastic tubing, but they have met with only limited success. Most other cooling methods require a complete shutdown in the event of a breakthrough and/or an increase in start up pressure which is already very high in impact extrusion processes. Thus, a new technique for cooling the inner surface of extruded thermoplastic pipe is desirable.

It is an object of the invention to cool extruded thermoplastic pipe.

Another object of the invention is to increase the rate of extrusion of thermoplastic pipe.

Another object of the invention is to prevent breakthrough during the extrusion of thermoplastic pipe.

Yet another object of the invention is to cool extruded thermoplastic pipe without increasing start up pressure.

Still another object of the invention is to eliminate the necessity of shutting down extrusion equipment in the event of a breakthrough.

Other aspects, objects and advantages of the invention will be apparent to those skilled in the art upon further study of the drawings, specification and appended claims.

SUMMARY

In accordance with the invention a flexible cylinder for cooling an extruded pipe is provided comprising a leading end and a trailing end, an outer surface interconnecting the ends with a portion of the outer surface being grooved, and an aperture located in the grooved portion of the cylinder near the trailing end.

Further in accordance with the invention an extruded pipe is cooled comprising the steps of pressurizing a flexible grooved cylinder with a fluid sufficient to form a fluid seal between a portion of the inner surface of the extruded pipe and a portion of the outer surface of the flexible grooved cylinder and passing a cooling fluid through a chamber formed by the grooves in the outer surface of the flexible grooved cylinder and a portion of the inner surface of the extruded pipe.

DETAILED DESCRIPTION

Figure 1:
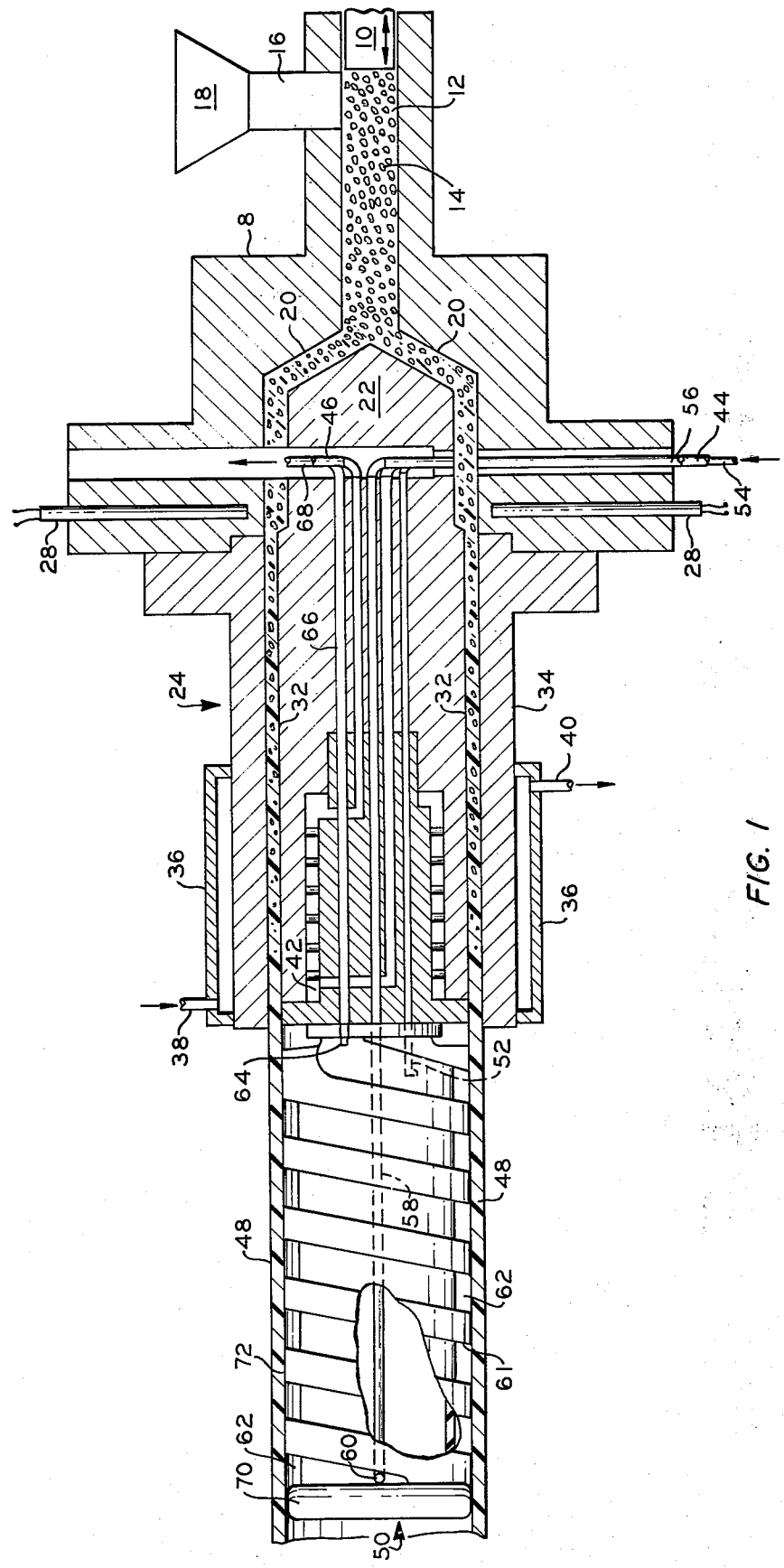
FIG. 1 is a cross section of an impact extrusion apparatus employing one embodiment of the present invention.

In one embodiment of the invention shown by the apparatus illustrated in FIG. 1, a piston 10 reciprocates in chamber 12 which is gravity fed with thermoplastic material 14 through opening 16 in chamber 12 by hopper 18 as the left end of piston 10 moves from a position in alignment with the right side of opening 16 to a position in alignment with the left side of opening 16. By the reciprocating motion of piston 10, the thermoplastic material is compacted and transferred through chamber 12 and into conicalshaped passage 20 formed by housing 8 and mandrel 22 of a long land die generally designated by reference numeral 24. Housing 8 is heated by cartridge heaters 28 which in turn heats the thermoplastic material 14 in chambers 12 and 20 to a temperature above its melting point. The melted thermoplastic material 14 is advanced to cylindrical chamber 32 of long land die 24 formed by sizing ring 34 and mandrel 22. Sizing ring 34 is cooled by cooling jacket 36 by passing cooling fluid from inlet 38 to outlet 40, and the downstream portion of mandrel 22 is cooled by coolant passageway 42 by passing cooling fluid from inlet 44 to outlet 46. As the melted thermoplastic material 14 is extruded through cylindrical chamber 32 to form pipe 48, at least the inner and outer surfaces of pipe 48 are cooled to a solidified state by circulating cooling fluid through cooling jacket 36 and coolant passageway 42.

Further according to this embodiment of the invention, a flexible cylinder, generally designated by reference numeral 50, is pressurized with a fluid through conduit 52 after the extruded pipe 48 passes over the flexible cylinder 50. Flexible cylinder 50 is coaxially disposed adjacent and attached to mandrel 22. Conduit 52 passes through mandrel 22 and housing 8 to inlet and outlet 54. A cooling fluid is passed from inlet 56 to outlet 60 of conduit 58. Conduit 58 passes through housing 8, mandrel 22, flexible cylinder 50 and ends at outlet 60 which communicates with the outer surface of flexible cylinder 50 with conduit 58. The cooling fluid in conduit 58 then passes to the outer surface of flexible cylinder 50 through outlet 60 of conduit 58 and along the chamber 62 formed by the helical grooves 61 in the outer surface of flexible cylinder 50 and the inner surface of pipe 48. As the cooling fluid passes through chamber 62, the inner surface of pipe 48 is cooled sufficiently to prevent breakthrough. A fluid seal is formed between the plug-like end portion 70 of flexible cylinder 50 and the inner surface of pipe 48 to prevent cooling fluid from passing beyond the plug-like end portion 70. A fluid seal is formed by the inner surface of pipe 48 and the higher portion of outer surface 72 of flexible cylinder 50 to prevent leakage of cooling fluid between adjacent grooves 61. However, it is noted that some leakage of cooling fluid between adjacent grooves 61 can be tolerated, but such leakage should be minimized. From chamber 62 the cooling fluid enters inlet 64 of conduit 66 and passes through mandrel 22 and housing 8 to outlet 68.

Figure 2:
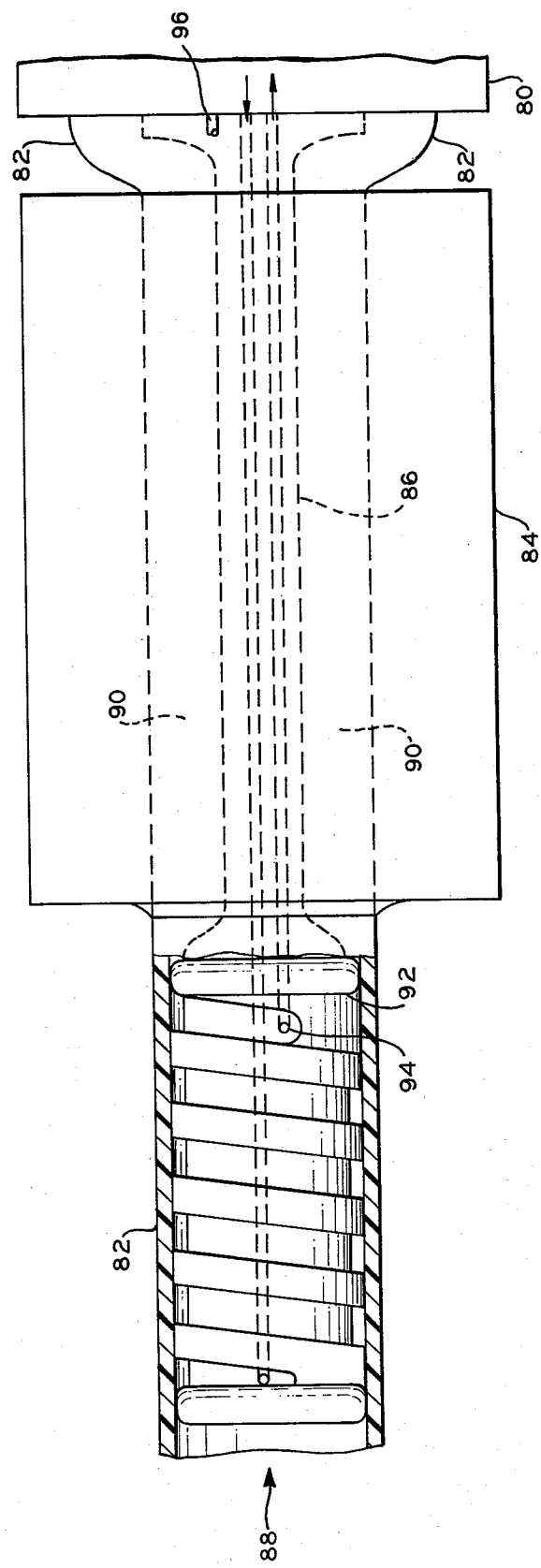
FIG. 2 is a fragmentary cross section illustrating the present invention adapted for use on a screw extruder.

In the embodiment illustrated in FIG. 2, a die 80, suitable for use on a screw extruder, is shown from which a molten thermoplastic pipe 82 is extruded and passed to a vacuum cooling tank 84 where at least the inner and outer surfaces of pipe 82 are cooled to a solidified state. Generally, a vacuum sizing ring as known in the art is incorporated into the front or upstream portion of the vacuum cooling tank 84 to adjust the size of pipe 82 to the desired dimensions. An extension 86 supports flexible cylinder 88 a distance from die 80 and forms chamber 90 with the inner surface of pipe 82 to permit vacuum sizing. Flexible cylinder 88 functions identical to flexible cylinder 50 of FIG. 1 with the exception that an additional fluid seal is formed by the plug-like front portion 92 of flexible cylinder 88 and the inner surface of pipe 82 to prevent cooling fluid around the outer surface of flexible cylinder 88 from entering chamber 90. Also inlet 94 for removing cooling fluid from flexible cylinder 88 is in the surface of flexible cylinder 88 rather than in the mandrel 22 as outlet 64 of FIG. 1. Conduit 96 provides a passage for the fluid required to pressurize flexible cylinder 88.

In the practice of the present invention, the extruded tube or pipe is passed over the flexible cylinder prior to pressurization. Then the flexible cylinder is pressurized or inflated to form the fluid seal between the plug-like end portion of the flexible cylinder and the inner surface of the pipe before passing the cooling fluid to the flexible cylinder. This procedure is generally desirable to prevent cooling fluid from passing beyond the flexible cylinder and any problems resulting therefrom.

Generally air is used as the fluid to pressurize the flexible cylinder and water is used as the cooling fluid to cool the extruded pipe; however, numerous other gases or liquids can be used for either the pressurizing fluid or the cooling fluid.

It is pointed out that a significant advantage of the present invention is in the elimination of the requirement to shut down the extrusion process in the event of a breakthrough to the inner surface of the pipe. Should such a breakthrough occur, the mass of material will normally pass over the flexible cylinder even when pressurized, although a reduction in extrusion rate and/or depressurization may be necessary. Particularly where large diameter pipe is produced, shutdown and start up are time consuming and costly; thus maintaining the extrusion operation during a breakthrough, even at a reduced extrusion rate, is a substantial advantage.

The material used to construct the flexible cylinder can vary widely. Most any material which will expand sufficiently to form a seal with the inner surface of the extruded pipe, which is impervious to the cooling fluid, and which can be grooved to provide a channel for cooling fluid is suitable. Silicone rubber is a suitable material or some other high temperature rubber. It is also feasible to construct the plug-like end portion of the flexible cylinder from a different material than that used for the grooved portion. A material with excellent sealing properties should be used for the plug-like end portion, since leakage beyond the plug-like end portion is generally undesirable. However, a material which is easily molded can be used for the grooved portion, even though it has only adequate sealing properties, since some leakage between adjacent grooves is permissible.

In some applications it may be desirable to use a pressurizing fluid also as the cooling fluid. In this case conduit 58 of FIG. 1 can be eliminated with only aperture 60 being used as an orifice. The orifice restricts the flow of cooling fluid sufficiently to maintain a greater pressure inside the flexible cylinder than on the outside and thus pressurizing or inflating the cylinder. In addition, an electrical valve can be used to open, close or vary the size of the orifice permitting pressurization before circulation which was earlier described as the preferred sequence of operation.

Generally the outside diameter (O.D.) of the flexible cylinder will be within the range of from about ⅛ to 2 inches smaller than the inside diameter (I.D.) of the extruded pipe being cooled. Of course it is understood that any reference to the dimensions of the flexible cylinder is made when the flexible cylinder is depressurized, unless otherwise indicated. If a relatively expandable material is used to construct the flexible cylinder, then a greater difference between the O.D. of the flexible cylinder and the I.D. of the extruded pipe can be tolerated. Also the O.D. of the flexible cylinder will more nearly approach the I.D. of the extruded pipe the smaller the I.D. of the extruded pipe. It is important that the depressurized flexible cylinder be small enough to permit the extruded pipe to easily slip over the flexible cylinder during start up. One of the significant advantages of the present invention is in eliminating additional backpressure or friction on the extruded pipe and thus reducing strain on the equipment during start up. This is especially important in impact extrusion processes because dies can be easily damaged during start up due to the tremendous pressures involved and dies for such processes are very costly.

The size of the grooves can vary widely, but they should provide for high, even flow of the cooling fluid for proper cooling of the extruded pipe. Although the helical groove configuration is preferred, other patterns can be used. Also it is within the scope of the invention to use cooling fluid flow patterns other than the countercurrent flow pattern illustrated in the drawings.

The length of the flexible cylinder also varies widely; but functionally speaking, it should be long enough to substantially solidify the extruded pipe to prevent breakthrough. Generally the length of the flexible cylinder is in the range of from about 1 to 5 times its outside diameter; however, lengths outside this range can be used.

The present invention finds particular utility in extrusion of large diameter thick-walled pipe. For example, pipe diameters in the range of from about 10 to 60 inches and wall thicknesses in the range of from about ½ to 2 inches are contemplated; however, the above dimensions are provided by way of illustration and are not intended as limitations on the invention.

What is claimed is:

1. Apparatus for cooling an extruded pipe, said apparatus comprising:
    a flexible cylinder;
    annular discharge orifice means of an extrusion means wherein said flexible cylinder is coaxially disposed adjacent said annular discharge means;
    means for passing a fluid to said flexible cylinder for cooling said extruded pipe and pressurizing said flexible cylinder;
    said flexible cylinder having a leading end, a trailing end, an inner surface and an outer surface, said leading end being attached to said annular discharge means, said trailing end having a plug-like end portion, said outer surface interconnecting said ends and having a portion with at least one groove and at least one land, said plug-like end portion of said trailing end and said land portion of said outer surface cooperating to form a fluid seal with the inner surface of the extruded pipe as the extruded pipe is passed over said flexible cylinder and said flexible cylinder is pressurized;
    a chamber formed by said ends and said inner surface;
    an aperture for passing said cooling fluid located near said trailing end and in the grooved portion of said outer surface of said cylinder;
    an aperture for passing a cooling fluid located near said leading end and in the grooved portion of said outer surface of said cylinder; and
    an aperture in said leading end for passing a pressurizing fluid to pressurize said chamber.

2. The apparatus of claim 1 wherein said means for passing a fluid to said flexible cylinder for cooling said extruded pipe and pressurizing said flexible cylinder comprise a separate cooling means, a separate pressurizing means and a conduit means passing through said leading end and attached to said cooling means and to said aperture located near said trailing end for passing a cooling fluid to the outer surface of said cylinder through said aperture without said fluid coming into contact with the inner surface of said cylinder.

3. The apparatus of claim 2 wherein the grooves of the grooved portion of said outer surface are helical.

4. The apparatus of claim 2 wherein said extrusion means is an impact extruder.

5. The apparatus of claim 2 including an extension means which is located between said annular discharge means and said cylinder wherein said leading end also forms a plug-like end portion to form a fluid seal between said leading end and the inner surface of said pipe and wherein said extrusion means is a screw extruder.

6. A method for cooling an extruded pipe comprising the steps of:
    passing an extruded pipe over the outer surface of a flexible grooved cylinder, said flexible grooved cylinder having an outer grooved surface, an inner surface, a leading end and a trailing end, said outer surface having a portion with at least one groove and at least one land;
    pressurizing said flexible grooved cylinder by passing sufficient fluid to a first chamber formed by the inner surface and the ends of said cylinder to form a fluid seal between the inner surface of said extruded pipe and the land portion of the outer surface of said cylinder and between the inner surface of said extruded pipe and the end portion of said flexible grooved cylinder in the direction of extrusion;
    passing said pressurizing fluid to a first end of a second chamber formed by the grooves in the outer surface of the flexible grooved cylinder and the inner surface of the extruded pipe to cool said pipe; and
    removing the fluid from said second chamber through a conduit in open communication with a second end of said chamber.

7. The method of claim 6 wherein a cooling fluid is passed to the first end of said chamber through a conduit in open communication therewith, thus isolating said cooling fluid from said pressurizing fluid.

8. The method of claim 7 wherein said cooling fluid is passed in said chamber countercurrent to the direction of extrusion.

9. The method of claim 8 wherein the pressurizing fluid is a gas and the cooling fluid is water.

10. The method of claim 9 wherein the extruded pipe is polyethylene pipe.

11. The method of claim 10 wherein extrusion is by impact extrusion.

12. The method of claim 10 wherein extrusion is by screw extrusion.

* * * * *